(12) United States Patent
Swindle et al.

(10) Patent No.: US 9,665,408 B2
(45) Date of Patent: May 30, 2017

(54) RESOURCE ALLOCATION (71) Applicant: Metaswitch Networks Ltd, Enfield (GB)

(72) Inventors: Christopher Neil Swindle, London (GB); Murray William Rogers, London (GB); John Patrick Batty, London (GB); Mark Edward Overton, London (GB); Christian Dominic Lund, London (GB)

(73) Assignee: Metaswitch Networks Ltd, Enfield (GB)

( * ) Notice: Subject to any disclaimer, the term of this patent is extended or adjusted under 35 U.S.C. 154(b) by 0 days.

(21) Appl. No.: 14/567,938

(22) Filed: Dec. 11, 2014

(65) Prior Publication Data

US 2015/0169374 A1  Jun. 18, 2015

(30) Foreign Application Priority Data

Dec. 12, 2013 (GB) .................................. 1322020.7

(51) Int. Cl.
  *G06F 9/46* (2006.01)
  *G06F 9/50* (2006.01)
  *H04L 29/06* (2006.01)

(52) U.S. Cl.
  CPC ........ *G06F 9/5088* (2013.01); *H04L 65/1083* (2013.01)

(58) Field of Classification Search
  CPC .. H04M 7/129; H04L 29/06027; H04L 12/14; H04J 3/22; G06F 9/5088; G06F 11/2028; G06F 11/2041
  See application file for complete search history.

(56) References Cited

U.S. PATENT DOCUMENTS

| | | |
|---|---|---|
| 6,338,130 B1 | 1/2002 | Sinibaldi et al. |
| 7,003,086 B1 | 2/2006 | Shaffer et al. |
| 7,233,600 B1 | 6/2007 | Chau et al. |
| 7,929,678 B2 | 4/2011 | Shaffer et al. |
| 2002/0101860 A1* | 8/2002 | Thornton ................ H04L 12/14 370/352 |

(Continued)

OTHER PUBLICATIONS

Pro Tools 10 Advanced Music Production Techniques by Robert Campbell (book).

(Continued)

*Primary Examiner* — Tuan Vu
(74) *Attorney, Agent, or Firm* — EIP US LLP (57) ABSTRACT Certain examples are described relating to resource allocation for one or more digital signal processors in a media gateway. Processing of telecommunication calls are allocated to different digital signal processor cores in the media gateway. When more processing resources are required for a call, a determination is made as to whether any of a set of digital signal processor cores are able to provide these resources. Responsive to a particular digital signal processor core being unable to provide the further processing resources, a reallocation process is initiated. This may involve reserving resources on a further digital processor core, releasing the original set of processing resources and allocating the processing of the call to the further digital processor core.

18 Claims, 10 Drawing Sheets

(56) References Cited

U.S. PATENT DOCUMENTS

| | | | |
|---|---|---|---|
| 2005/0094650 A1* | 5/2005 | Choi | H04L 29/06027 370/401 |
| 2005/0157855 A1* | 7/2005 | Pelaez | H04M 7/129 379/88.16 |
| 2007/0116018 A1 | 5/2007 | Doleh et al. | |
| 2008/0117898 A1 | 5/2008 | Davidson et al. | |
| 2015/0071297 A1* | 3/2015 | Tsoutsaios | H04J 3/22 370/401 |

OTHER PUBLICATIONS

Cisco Systems, Inc. "Troubleshooting Unrecognized Voice Interface Cards on Cisco 1750, 1751, and 1760 Routers," Document ID: 5711, Feb. 2, 2006. Online resource found at: http://www.cisco.com/image/gif/paws/5711/1750-vic-issues.pdf.

* cited by examiner

RESOURCE ALLOCATION

CROSS-REFERENCE TO RELATED APPLICATIONS

This application claims priority under 35 U.S.C. §119(a) to GB Patent Application No. 1322020.7, filed on Dec. 12, 2013, the entire content of which is hereby incorporated by reference.

BACKGROUND OF THE INVENTION

Field of the Invention

The present invention relates to resource allocation. In particular, but not exclusively, the present invention relates to resource allocation for one or more digital signal processors in a media gateway.

Description of the Related Technology

In a communications network, a media gateway is used to couple two or more networks. Typically these networks are different. When coupling networks of different types, a media gateway converts media provided in a first format from a first type of network to a second format required in a second type of network. For example, a media gateway may terminate bearer channels from a switched circuit network (e.g. DSOs) and media streams from a packet network (e.g. real-time transport protocol (RTP) streams in an internet protocol (IP) network). In this way, public-switched telephone networks may be coupled to packet-switched IP networks and vice versa.

Figure 1:
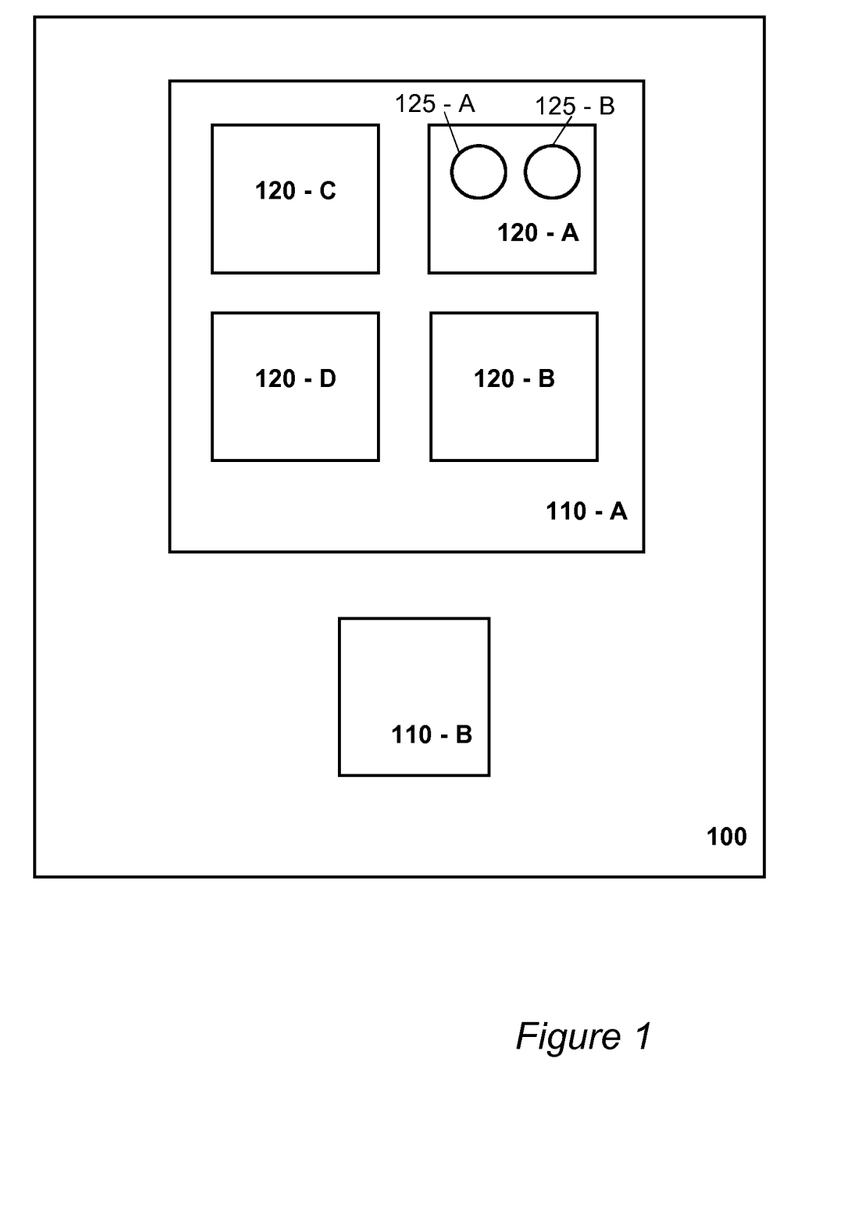
FIG. 1 is a schematic diagram showing a media gateway.

The term media gateway is typically used to refer to a combination of hardware and control software; for example, a physical computing device or server executing, in use, one or more sets of computer program code. FIG. 1 shows an example of a media gateway 100. The physical computing device typically comprises one or more digital signal processors (DSPs). In FIG. 1, media gateway 100 is shown with two DSPs 110-A and 110-B. A DSP is a processing component that has an architecture optimized for performing digital signal processing. For example, a DSP may have a specialized instruction set adapted to repeatedly perform a number of mathematical functions on a number of data samples that form part of a signal stream. Each DSP may comprise a plurality of processing cores. In FIG. 1, the first DSP 110-A is shown as having four DSP cores: 120-A to 120-D. The DSP cores of the second DSP 110-B are omitted for clarity. The term "core" is used to refer to a central processing unit that is able to read and execute computer program code. This code may be retrieved from random access or read only memory. A media gateway may have a plurality of DSPs, wherein each DSP has a plurality of cores. Each DSP core has a number of resources. These resources may comprise, for example, one or more of: processing resources associated with a number of instructions that can be processed by a central processing unit; memory and/or cache for storing data and/or instructions; and conference resources associated with a conference call.

A media gateway processes one or more communication channels. These may comprise logical channels that carry data associated with communications between two or more parties. In the context of one or more DSPs that constitute a media gateway, the term "DSP channel" is used to refer to a data processing unit that processes or handles data carried in a communications channel. The data may relate to a media stream or control data. For example, a DSP channel may process an RTP/Nb stream or a DSO stream, handle High-Level Data Link Control (HDLC) signaling or play media from an announcement file into a media stream. In practice a media gateway may be capable of processing audio, video and T.120 protocol data alone or in any combination. It may also be capable of full duplex media translations as well as playing audio and/or video messages. It is also capable of performing other interactive voice response (IVR) functions and may perform media conferencing.

When processing data with one or more DSPs in a media gateway, a DSP context is established. A DSP context is a collection of one or more DSP channels. These channels may be related. For example, the may comprise audio and video channels for a teleconference. In use, a DSP context is established in relation to a DSP core. The DSP core is then responsible for processing any DSP channels within that DSP context, for example until a call ends. In FIG. 1, two DSP contexts 125-A and 125-B are schematically shown. These DSP contexts 125 are assigned to a first DSP core 120-A. The DSP contexts assigned to the other DSP cores are not shown in FIG. 1 for clarity.

In a communications network, it is often difficult to handle processing loads at a media gateway. For example, a DSP context needs to be established when a call is made; however future DSP core resource usage is not always known at the start of a call. For example, as a call progresses further DSP core resources may be required. As a DSP may also handle a plurality of DSP contexts, e.g. a plurality of calls, simultaneously, a DSP core processing a particular DSP context can often run out of available resources and be required to decline requests. For example, it may not be possible to add additional participants to a call or add video capabilities to an existing audio call.

SUMMARY

According to a first embodiment of the present invention, there is provided a method for controlling resource allocation in a media gateway, the method comprising: allocating the processing of a call to a first digital signal processor core in a plurality of digital signal processor cores, the media gateway comprising one or more digital signal processors and the one or more digital signal processors comprising the plurality of digital signal processor cores, the processing requiring a first set of processing resources on the first digital signal processor core; receiving a request requiring a second set of processing resources for processing the call, the second set of processing resources being in addition to the first set of processing resources; determining whether any of the plurality of digital signal processor cores are able to provide both the first and second set of processing resources; and responsive to the first digital signal processor core being unable to provide the second set of processing resources: reserving at least a first set of processing resources on a second digital processor core in the plurality of digital signal processor cores that is able to provide the second set of processing resources, releasing the first set of processing resources on the first digital processor core, and allocating the processing of the call to the second digital processor core, the processing using the first and second set of processing resources on the second digital processor core.

According to a second embodiment of the present invention, there is provided a controller for performing the method of the first embodiment. The controller may form part of the media gateway.

Further features and advantages of the invention will become apparent from the following description of embodi-

DETAILED DESCRIPTION OF CERTAIN INVENTIVE EMBODIMENTS

As described above a DSP core may be used for media processing within a media gateway. The DSP core has a number of limited resources. Examples of such resources are, for example, one or more of: central processing unit (CPU) resources, such as processing cycles or use of the CPU; memory, such as for storing data and/or instruction sets; DSP channels; and conference resources. For example, there can be limits on the total number of channels on the DSP core which can be in a conference call, plus there can be a limit on the total number of conference calls on a DSP core. In a typical example, a DSP comprises a number of separate DSP cores and a media gateway comprises a plurality of DSPs. In general, a media gateway comprises at least one DSP with at least a plurality of DSP cores. A typical communications network may have one or more media gateways. The communications network allows a first user of a first device to communicate with a second user of a second device. For example, a first user may communication with a second user via an audio and/or video call. In other cases, a user may access services of a communication network via a call; for example, they may access voicemail or IVR services.

When a call is made that requires one or more channels on a DSP, it is required to allocate some of the resources for that call from a particular DSP core. As it is not always known at the start of a call how many of the limited resources will be required for the entire call, it is difficult to determine which DSP core a call should use. This means that it is difficult to distribute calls that are processed by the media gateway so that they make full use of the DSP resources across all of the available DSP cores.

Figure 2A:
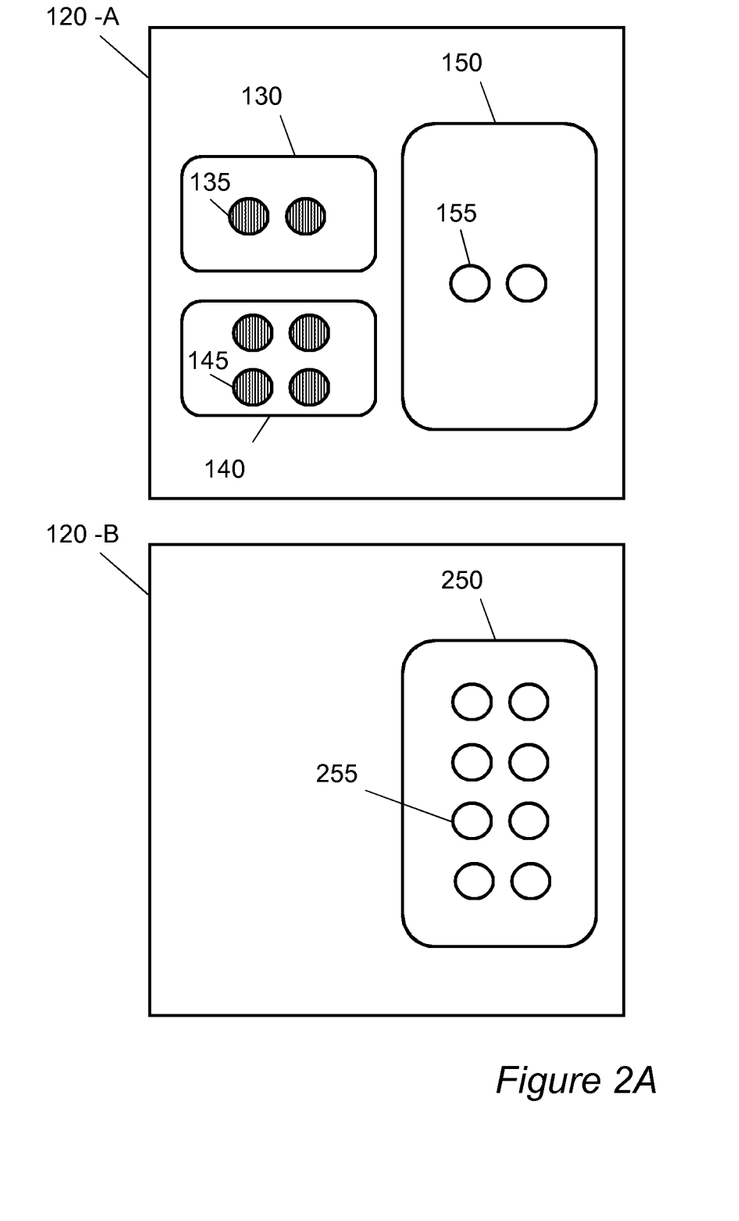
FIGS. 2A to 2D are schematic diagrams showing four stages of an example of allocating resources within a media gateway.

For example, FIG. 2A shows an example configuration of two DSP cores 120-A and 120-B during operation. Both cores 120 may form part of a DSP 110, for example may comprise DSP cores 120-A and 120-B as illustrated in FIG. 1. In the example of FIG. 2A, the first DSP core 120-A is performing processing associated with two telecommunications calls. A first set of resource units are required for the first call 130. A second set of resource units are also required for the second call 140. Each resource group may comprise a DSP context; as such they are assigned to the first DSP core 120-A. In the example of FIG. 2A the first DSP core also has a number of free resources 150. Each call may comprise, for example, an audio and/or video call, for example between users or in relation to services provided by the communication network. In the example of FIG. 2A each of the two DSP cores has eight available resource units. These resource units may be associated with one or more channels associated with the call; for example, each resource unit may comprise a number of CPU cycles (e.g. a percentage share of CPU use) or a fixed-size portion of memory (e.g. X bytes of data). In certain cases each resource unit may comprise one or more DSP channels. These may form part of a DSP context. In some cases a resource unit may relate to a plurality of DSP channels that form part of a DSP context. Resource units may vary depending on one or more resources being tracked. Resource units may also comprise a combination of resources, e.g. a number of CPU cycles and a number of bytes of data, or a mixture of channels with differing properties.

With reference to FIG. 2A, the first call 130 may initially require two resource units 135. At the time shown in FIG. 2A, four resource units 145 are being used for the second call 140. There are thus two free resource units 155. As a call progresses further resources may be required. For example, if the first call is initially an audio call, the users may wish to add one or more video feeds. Alternatively, the two users may wish to conference a third user into the first call. Or in a third case, a call may be using uncompressed audio and a request is for use of compressed audio: this would require at least more CPU bandwidth to perform compression and/or decompression. Or in a fourth case, if an announcement needs to be played on a channel then this may require further resources, the request being a request relating to the announcement. If the further resources that are required exceed those available on a DSP core then, in a comparative case, the request for additional resources must be denied. For example, if the first call 130 requires three additional resource units then it is not possible to perform the request: there are only two free resource units 155 that are available on the first DSP core 120-A.

In FIG. 2A it is shown how, even though the first DSP core 120-A cannot fulfil a request for three additional resource units, the second DSP core 120-B has a number of free resources 250. In the example of FIG. 2A, the second DSP core 120-B has eight free resource units 255. As the processing associated with a call involves a DSP context, it has been assumed that the processing must be limited to the DSP core that initially set up the call. However, certain examples described herein provide a method of transferring that processing between DSP cores. This then allows more efficient use of DSP resources. It also reduces the number of requests that are refused by the media gateway.

For example, in accordance with certain exemplary methods described herein, DSP channels may be atomically moved from one DSP core to another DSP core. A first DSP core may not have access to sufficient resources to process a request for additional functionality but a second DSP may have sufficient resources available to handle the call. In certain examples, a check is made to determine which DSP cores have resources available for the resources required. Resources are then reserved on a DSP core with sufficient capacity. If processing is to be transferred to a new DSP core then DSP resources that were used for processing the call are reserved on the new DSP core and then freed on the old DSP core. DSP resources are then allocated on the new DSP core such that the processing is ported from the old DSP core to the new DSP core. In certain cases, the DSP resources that are reserved on the new DSP core match those that were used on the old DSP core; additional resources to handle a request for added functionality are then reserved after the processing is transferred. In other cases, the DSP resources that are reserved on the new DSP core may comprise a set that match those used on the old DSP core plus a set to fulfil the later request.

Figure 2B:
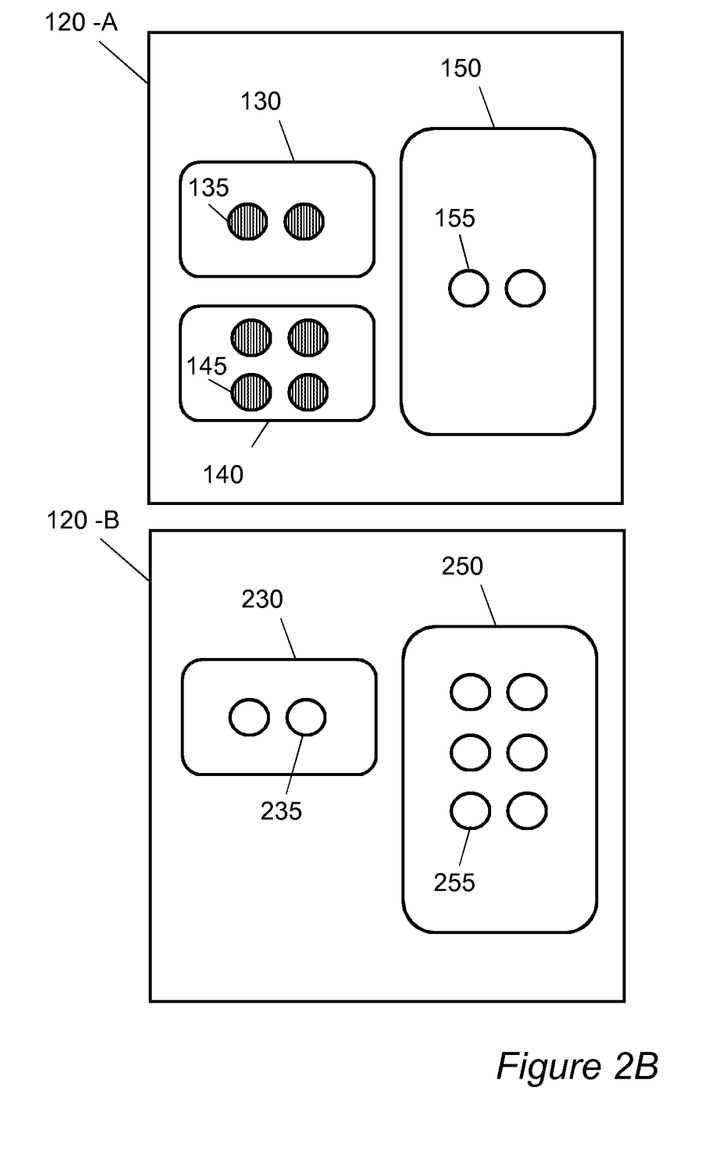
Figure 2C:
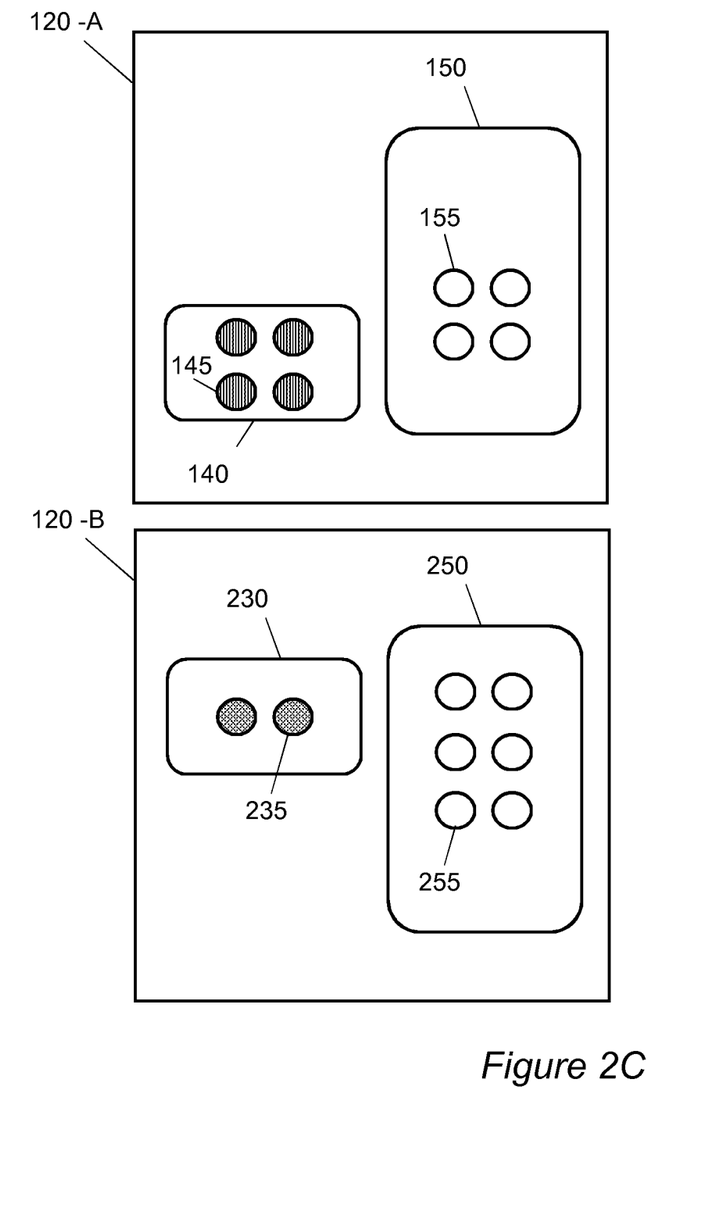
Figure 2D:
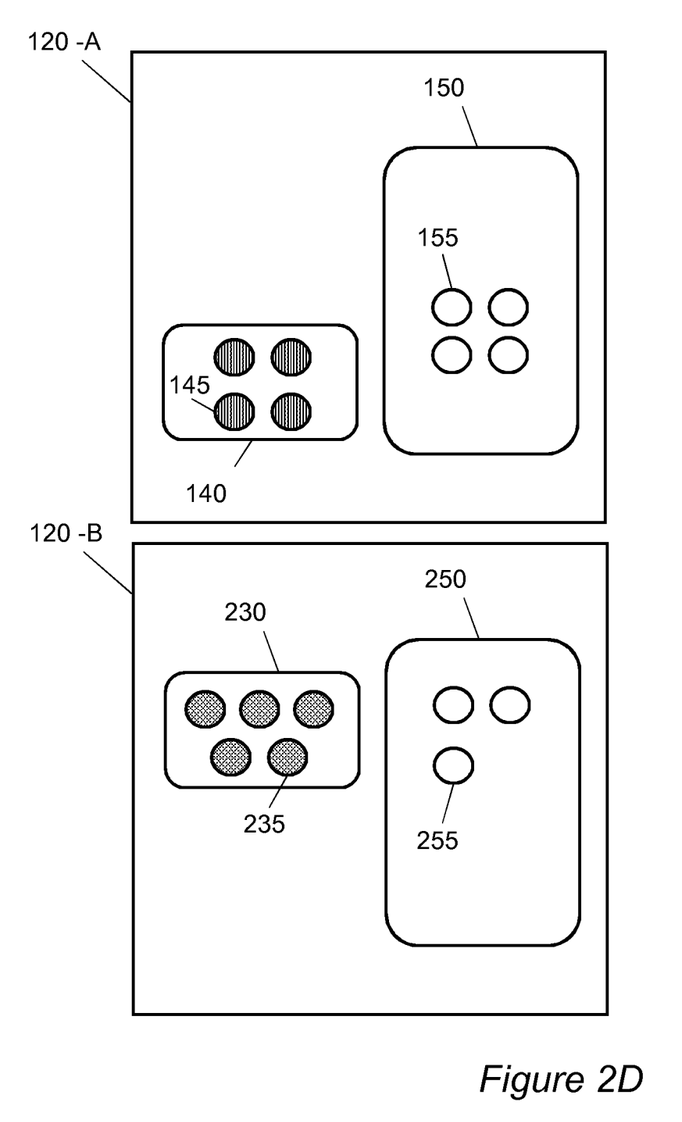
Figure 3:
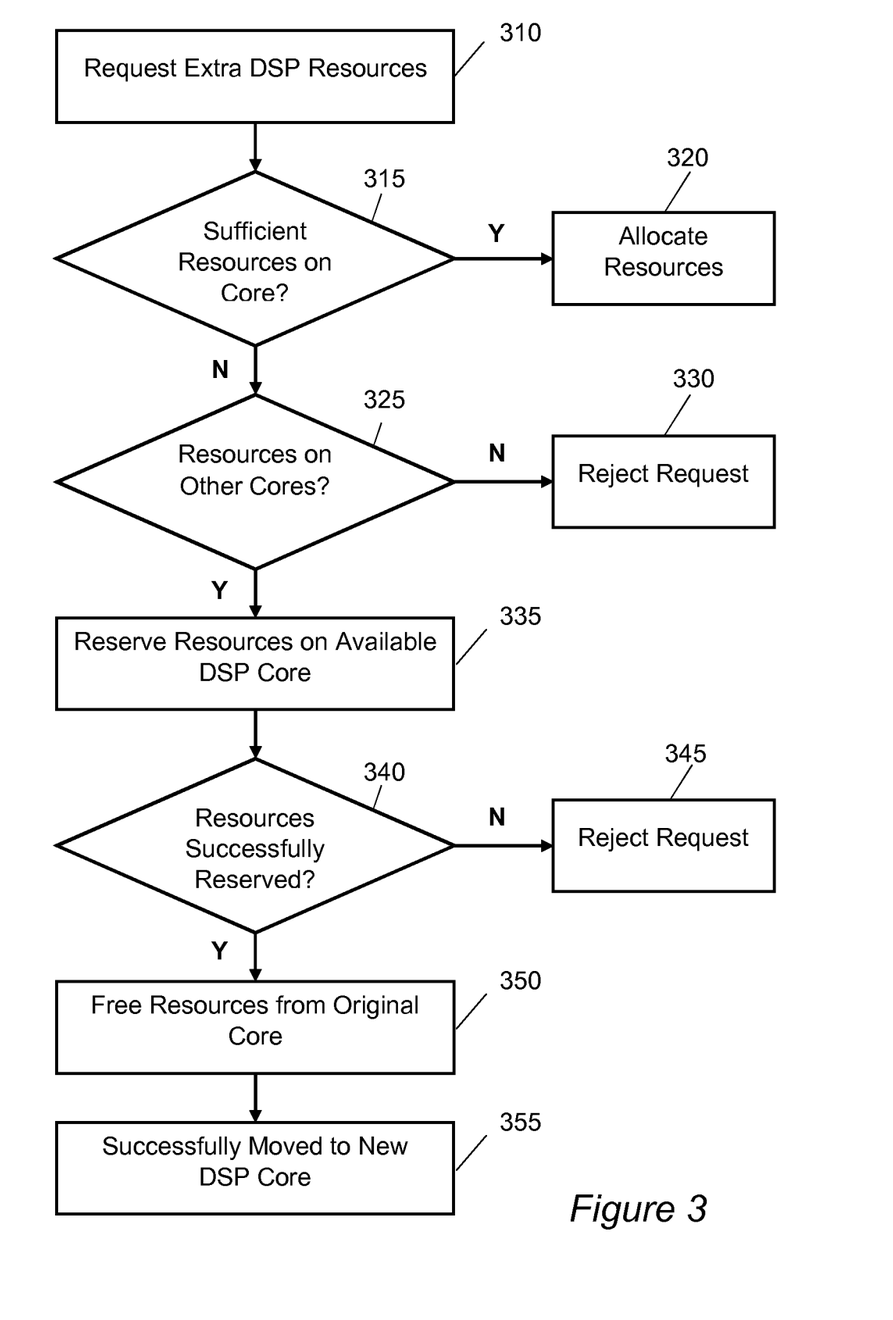
FIG. 3 is a flow chart showing an example method of allocating resources within a media gateway according to one or more embodiments of the present invention.

An example method will now be described with reference to FIG. 3. An exemplary result of this method will be illustrated schematically with reference to FIG. 2A to 2D. Starting from the case of FIG. 2A described above, a first DSP core 120-A processes a first call 130 and a second call 140. Turning to FIG. 3, a request for additional functionality in relation to the first call 130 is received at the media gateway at block 310. In the example of FIGS. 2A to 2D, the request requires three additional resource units to be added to the first call 130. As discussed above, in a comparative example this request is refused. However, in the present case, at block 315 a determination is made as to whether there are sufficient free resources on the first DSP core 120-A to handle the request. In the example of FIG. 2A there are not: there are only two free resource units 155. If there were sufficient free resources they would be added to the call at block 320. As there are insufficient free resources in the example of FIG. 2A, a check is made at block 325 as to whether there are sufficient free resources on other DSP cores of the media gateway. These may be DSP cores that form part of the same DSP as the first DSP core 120-A and/or they may be DSP cores from other DSPs within the media gateway. In this case "sufficient" resources comprise enough resource units to handle the current resource requirements for the call plus the requested additional resources. In the case of FIG. 2A sufficient resources comprise five resource units: two resource units to handle the existing processing 135 plus three resource units based on the request. If there are insufficient free resources on any of the available DSP cores, e.g. if in the present case no DSP core has five free resource units, then the request is rejected at block 330. However, in the case of FIG. 2A it is determined that the second DSP core 120-B has sufficient free resources 250: the second DSP core 120-B has eight free resource units 255 and so can spare five resource units to handle the existing processing and the request.

Returning to FIG. 3, responsive to sufficient resources being available at block 325, at least a portion of these resources are reserved on the available DSP core at block 335. If multiple DSP cores have capacity then a heuristic may be used to select a particular DSP core. For example, DSP cores that form part of a common DSP may be preferred. In FIG. 2B, a first set of two resource units 235 are reserved on the second DSP core 120-B to match the set of two resource units 135 being used to process the first call 130 on the first DSP core 120-A. As can be seen in FIG. 2B, these two resource units 235 are taken from the pool of available free resources 250 on the second DSP core 120-B.

Following block 335, in FIG. 2B there are a first set of allocated resources 130 for processing the first call on the first DSP core 120-A and a second set of reserved resources 230 for processing the first call on the second DSP core 120-B. In certain cases that are not shown in FIGS. 2A to 2D, all five required resources may be reserved on the second DSP core 120-B. Whether this is performed may depend on an architecture of the media gateway and/or one or more DSPs.

At block 340, a check is made to determine if the resources on the second DSP core 120-B have been successfully reserved. If it is not possible to reserve resources on another DSP core then the request may be rejected at block 345. In this case, the call would continue to be processed, without the fulfilled request, on the original DSP core. In FIG. 2B, the resources 230 have been successfully reserved on the second DSP core 120-B, and so the method continues to block 350, wherein the resources 130 previously used for processing the first call on the first DSP core 120-A are released. This is shown in FIG. 2C, wherein the two resource units that were previously used to process the first call are returned to the free resources 150. In the case of FIG. 2C the additional resources required by the request are not initially reserved at block 335. In this case, the additional three resources units required by the request are also allocated on the second DSP core 120-B at block 350. This is shown in FIG. 2D, wherein five resource units 235 are now allocated on the second DSP core 120-B to process the first call 230 and the request. As can be seen, in FIG. 2D there are now three free resource units 255 in the pool of free resources 250. The method of FIG. 3 then ends at block 355 wherein the first call has been successful moved to a new DSP core and the received request has been fulfilled.

The example method described above may be useful where there are insufficient DSP resources on a current DSP core for a request. It may also be used if it is desired to move a call to a specific DSP core. For example, if there is a DSP chip failure, such that processing on a particular DSP core is impacted, this processing may be moved to a different DSP core. Moreover, by efficiently distributing call processing across DSP cores, in a manner that is dynamic as calls are started and closed, the described example has an advantage that fewer calls would be impacted by a failure of a single DSP core. In certain cases a DSP core may handle up to one hundred telephone calls; if these are clustered on a single DSP core this may lead to a fragile system and loss of those calls if the core fails.

As described above, in one case, all required resources may be reserved at block 335, for example both the resource units currently in use on an old DSP core and the resource units required to service the request. In another case, the resources currently in use on the old DSP core may be first reserved on the new DSP core, with the additional resources required to service the request being allocated once the resources on the old DSP core have been freed. The latter case has a benefit that it is does not require the system to keep track of the additional resources required, the request may simply be re-directed to the newly allocated DSP core to allocate the additional resources. However, there may be a benefit to apply the former case for certain situations, for example where the architecture allows it and where a faster assignment is required.

To perform the check at block 315, an amount of DSP resources that are currently in use may be tracked. For example, the amount of free resources that is available may be determined by comparing the tracked amount with a capacity for a DSP core. The amount of free resources may then be compared with the amount of additional resources required to service a request. If there are sufficient resources on a current DSP core, then there is no requirement to perform a move. In this case, resource units, for example in the form of the new channels, are allocated on the current DSP core.

To reserve resources at block 335, resource units, such as channels, may be marked as in use. If the reservation operation at block 335 fails for any of the resources on the new DSP core, then all of the reserved DSP resources on the new DSP core may to freed and processing may continue on the old DSP core. In this case, the request may be rejected at block 345. If all of the DSP resource reservations were successful then a call to be transferred has everything it requires. In certain cases these resources on the new DSP core are not actually used until the call is transferred.

However, the reservation enables capacity on the new DSP core to remain unused until the resources are required to process the call.

To transfer or move a call to a new DSP core, blocks 350 and 355 are performed. After resources are reserved at block 335, the media gateway commits to move the call to use the new DSP core. Moving the DSP resources may be performed as a two stage process. First, the used DSP resources on the original DSP core are released. Second, the required DSP resources on the new DSP core are allocated. The allocation thus completes the transfer or move. In other cases, moving the DSP resources may be performed as a single step, depending on the capabilities of the media gateway architecture.

Following successful reservation of resources at block 335, failures during subsequent blocks are unlikely. However, if there is a failure to allocate resources, e.g. in transferring a call from an old DSP core to a new DSP core, a particular procedure may be followed. This is shown in FIGS. 4A to 4D and described below.

Figure 4A:
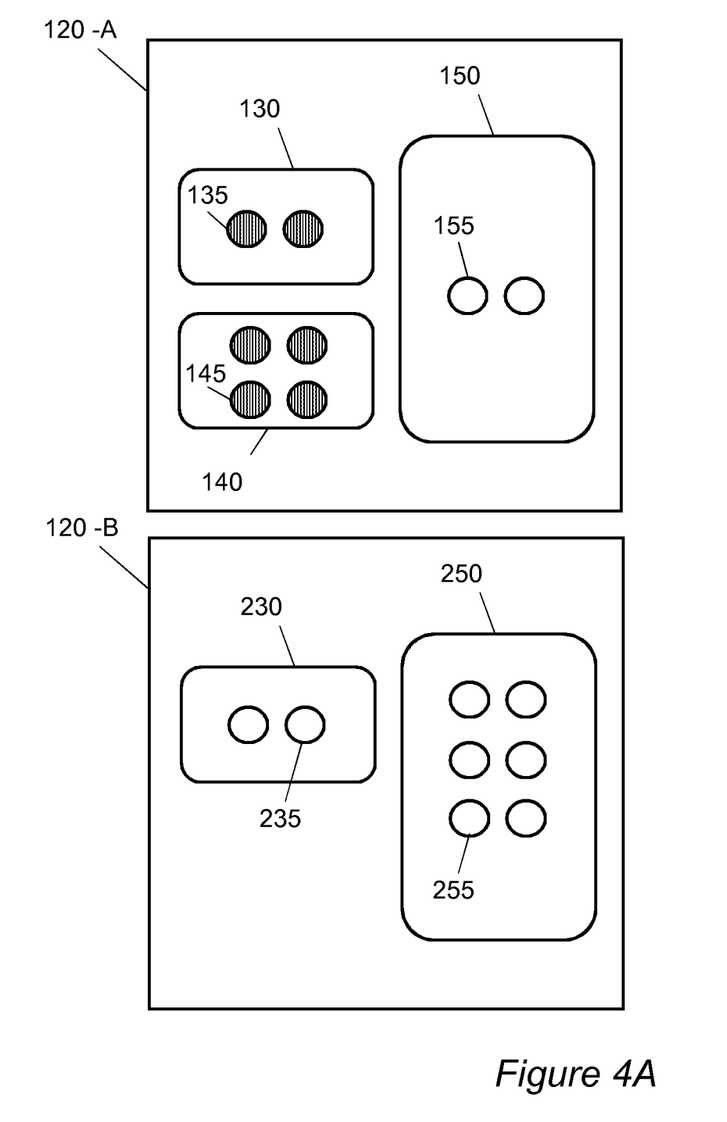
FIGS. 4A to 4D are schematic diagrams showing an example wherein one resource is not able to be successfully allocated according to one or more embodiments of the present invention.

FIG. 4A shows an example following reservation of resources on a second DSP core. For example, two resource units 235 have been reserved on the second DSP core 120-B for processing a first call 230. These reserved resources match those currently used for processing the first call 130 on a first DSP core. At this stage the media gateway is ready to transfer the call from the first DSP core to the second DSP core.

Figure 4B:
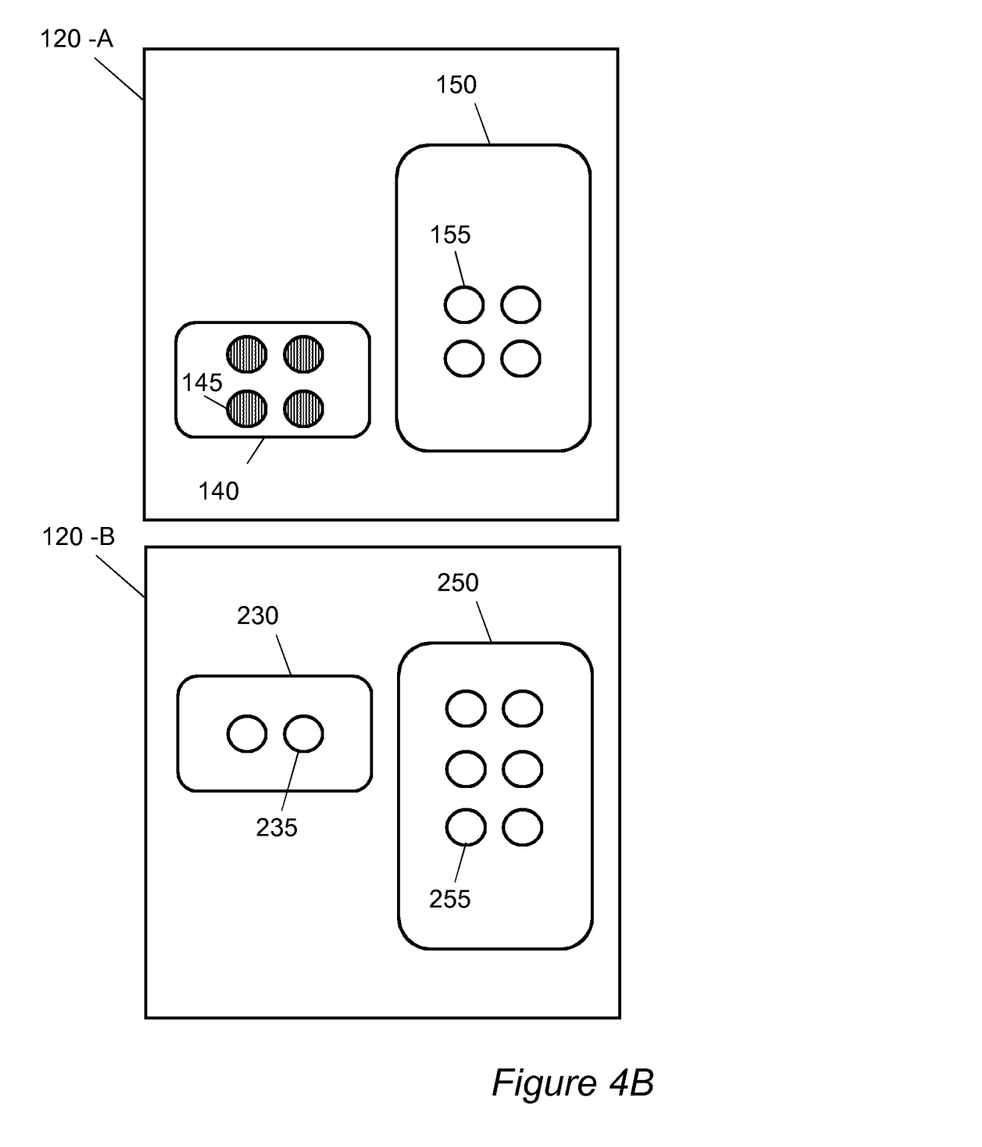
Figure 4C:
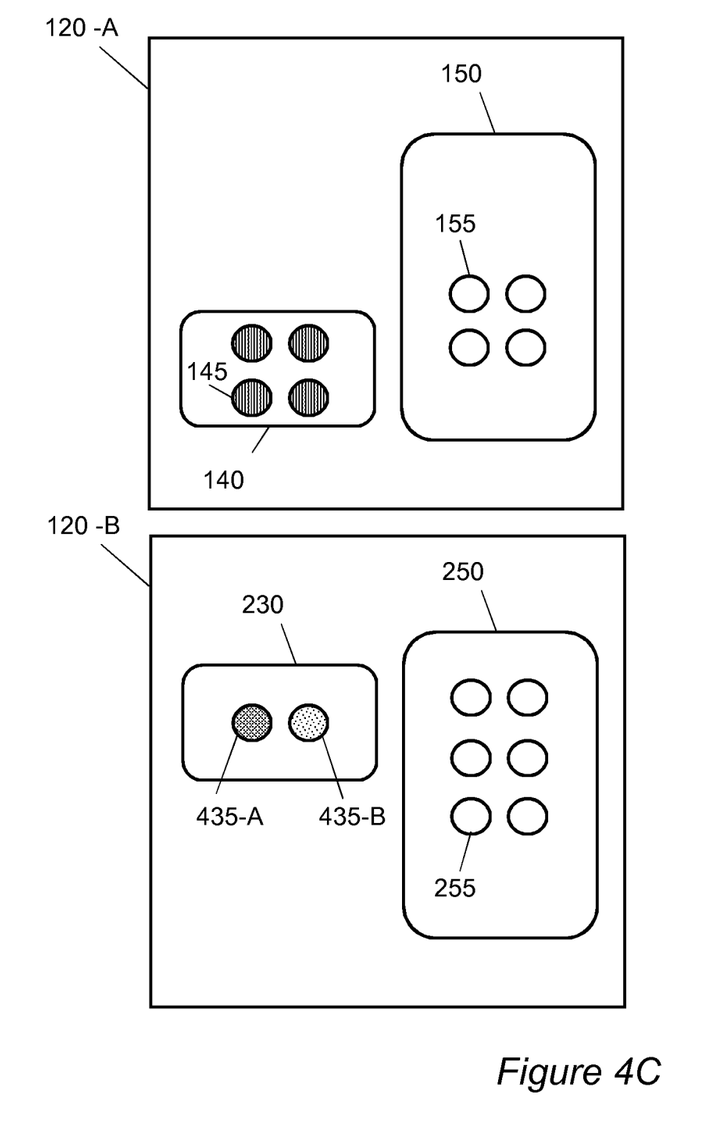
Figure 4D:
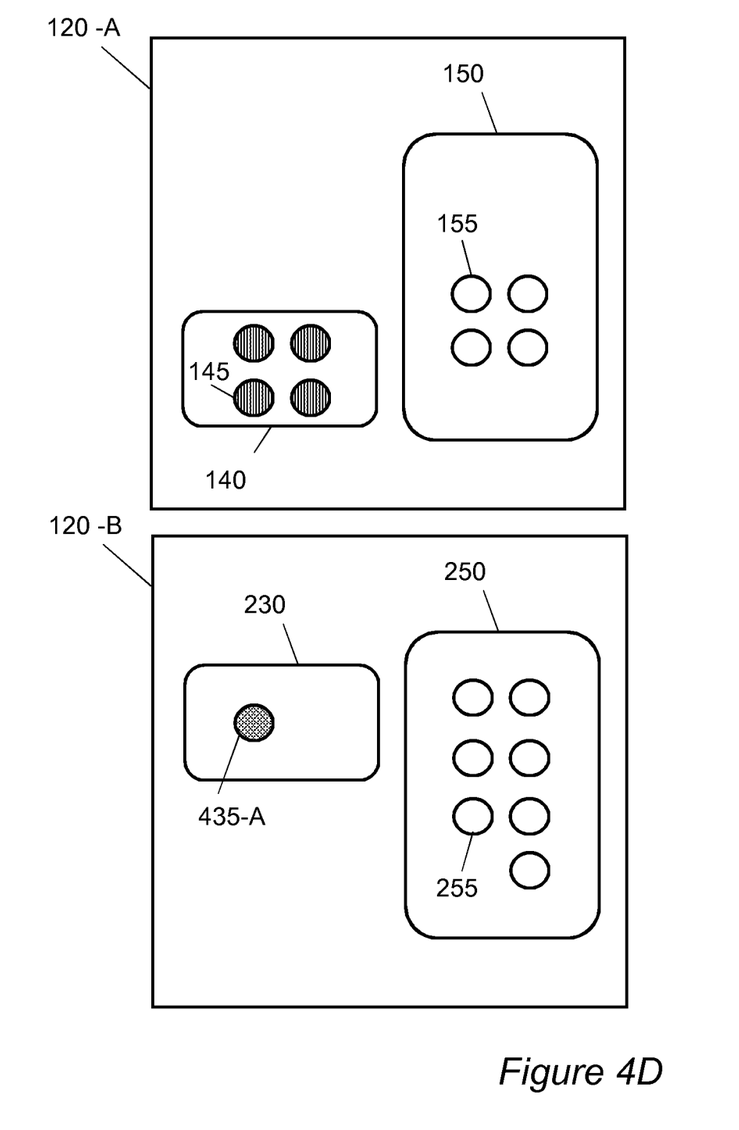

In FIG. 4B the resources for processing the first call 130 are freed on the first DSP core 120-A. For example, this may be performed following block 350. In FIG. 4C the resources are allocated on the second DSP core 120-B, i.e. the processing of the call is transferred from the first DSP core 120-A to the second DSP core 120-B. However, in the case of FIG. 4C an error occurs during allocation. In this case one of the resource units 435-B fails to be allocated on the second DSP core 120-B. For example, there may be an error transferring one of the channels from the first DSP core 120-A. In this case the error is reported and the call continues with a single resource unit 435-A as shown in FIG. 4D. As such at the end of this stage the call is on the new DSP core and there are no resources used on the old DSP core for the call. In certain cases, as shown the failed resource unit may be reconfigured and added back to the free resources 255. In another case, it may not be available as a free resource until an error has been investigated and/or reset. In this way, where there is a failure to allocate a particular DSP resource then an error is returned for that DSP resource, but the other DSP resources are still moved to the new DSP core. An advantage of using this method for the rare cases of a dropped resource unit, such as a dropped channel, is that, following a successful reservation, it is clear that the new DSP core is used for the call. In an alternative case, the call could also revert to the old DSP core.

Example methods as described above build upon load balancing schemes for DSPs in a media gateway. In these schemes a DSP core may be selected to process a new call based on remaining capacity on this core. However, these schemes only operate to balance processing loads as estimated at the start on a call. If the resources required by a call change over time then this is not handled by such schemes. As described previously, at a start of a call sufficient DSP channels may be allocated on a DSP core based on the received call characteristics. However, these channels form part of a DSP context and as such are limited to the initially assigned DSP core. If over time, the initially assigned DSP core handles more calls, then its free resources may be depleted, making it unable to handle any changes in call characteristics. For example, if a request was received in relation to a call that increased the DSP resource usage, e.g. that required the addition of further DSP channels within the DSP context, but there are insufficient resources left, then the request was rejected. This leads to problems when a media gateway is loaded towards an upper range of its theoretical maximum loading. In this case, there is likely to be at least one DSP core that is unable to service requests for additional resources, at which point it is hard to successfully program calls using the remaining DSP resources. In comparison, when using certain methods described herein, requests for additional resources are more likely to be successful. For example, in one test case, 25% of conference calls would fail, even though a maximum theoretical loading was not reached. However, using certain methods described herein there were no failures; a media gateway was able to handle all of the conference calls up to the maximum supported value.

Certain methods as described herein reduce the need to identify what resources may be used by a call ahead of an allocation to a particular DSP core. For example, it may be difficult to predict how many users may join a call or what requirements they will have during the call (e.g. need for video or to share media). While identifying specific scenarios that may require specific DSP resources may work for certain cases, it is generally inflexible. Certain methods described herein also avoid having to adapt signaling used to control the media gateway and also avoids changes on other components in the network. For example, automatically moving DSP resources as described herein has the advantage that it is internal to the media gateway and thus transparent to components outside of the media gateway. Certain presently described methods also provide benefits when handling video calls. As video calls typically require more DSP resources than audio calls, a typical DSP would be able to deal with much fewer video calls than audio calls. This means that many DSPs within a media gateway would operate near their theoretical maximum loading if there was a high video call demand. As certain methods described herein provide benefits when DSPs are operating under these conditions, the efficiency of a media gateway can be increased to cope with future changes in call patterns.

Certain methods as described above may be implemented in a hardware controller of the media gateway. However, in other examples they may be implemented in one or more software controllers and/or a combination of hardware and software, such as programmable logic controllers. Examples may also comprise a computer program product comprising a (non-transitory) computer-readable storage medium having computer readable instructions stored thereon, the computer readable instructions being executable by a computerized device to cause the computerized device to perform at least one of the methods described above.

The above description describes a number of illustrative examples. Further examples are envisaged. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

What is claimed is:

1. A method for controlling resource allocation in a media gateway, the method being performed at a media gateway by way of instructions that are executed by a controller of the media gateway, the method comprising:

allocating the processing of a call to a first digital signal processor core in a plurality of digital signal processor cores, the media gateway comprising one or more digital signal processors and the one or more digital signal processors comprising the plurality of digital signal processor cores, the processing requiring a first set of processing resources on the first digital signal processor core;

receiving a request requiring a second set of processing resources for processing the call, the second set of processing resources being in addition to the first set of processing resources;

determining whether any of the plurality of digital signal processor cores are able to provide both the first and second set of processing resources, wherein providing the first and second set of processing resources comprises providing at least a sum of the first and second set of processing resources; and responsive to the first digital signal processor core being unable to provide the second set of processing resources:

reserving at least a first set of processing resources on a second digital processor core in the plurality of digital signal processor cores that is able to provide the second set of processing resources, releasing the first set of processing resources on the first digital processor core, and allocating the processing of the call to the second digital processor core, the processing using the first and second set of processing resources on the second digital processor core, wherein the second digital processor core provides the first and second set of processing resources, which comprises providing the at least the sum of the first and second set of processing resources.

2. The method of claim 1, wherein the processing forms part of a digital signal processor context, a digital signal processor context comprising one or more digital signal processor channels that are limited to a particular digital signal processor core.

3. The method of claim 1, wherein the call comprises one or more of:
at least one video call;
at least one audio call;
a request for a telecommunications service; and
a teleconference.

4. The method of claim 1, comprising:
responsive to the first digital signal processor core being able to provide the second set of processing resources, allocating the second set of processing resources on the first digital signal processor for the processing of the call.

5. The method of claim 1, comprising:
determining if at least the first set of resources are successfully reserved on the second digital processor core, and
responsive to at least the first set of resources being unsuccessfully reserved, rejecting the request.

6. The method of claim 1, comprising:
responsive to no one of the plurality of digital signal processor cores being able to provide the second set of processing resources, rejecting the request.

7. The method of claim 1, wherein reserving at least the first set of processing resources on the second digital processor core comprises reserving both the first and second set of processing resources on the second digital processor core.

8. The method of claim 1, wherein each set of processing resources comprises one or more resource units, the resource units being associated with at least one of: central processor unit resources, memory resources and teleconference resources.

9. The method of claim 8, wherein a resource unit comprises one or more digital signal processor channels.

10. A controller for controlling resource allocation in a media gateway, the media gateway comprising a plurality of digital signal processor cores, the cores forming part of one or more digital signal processor, wherein the controller is configured to:

allocate the processing of a call to a first digital signal processor core in a plurality of digital signal processor cores, the media gateway comprising one or more digital signal processors and the one or more digital signal processors comprising the plurality of digital signal processor cores, the processing requiring a first set of processing resources on the first digital signal processor core;

receive a request requiring a second set of processing resources for processing the call, the second set of processing resources being in addition to the first set of processing resources;

determine whether any of the plurality of digital signal processor cores are able to provide both the first and second set of processing resources, wherein providing the first and second set of processing resources comprises providing at least a sum of the first and second set of processing resources; and responsive to the first digital signal processor core being unable to provide the second set of processing resources:

reserve at least a first set of processing resources on a second digital processor core in the plurality of digital signal processor cores that is able to provide the second set of processing resources, release the first set of processing resources on the first digital processor core, and allocate the processing of the call to the second digital processor core, the processing using the first and second set of processing resources on the second digital processor core, wherein the second digital processor core provides the first and second set of processing resources, which comprises providing the at least the sum of the first and second set of processing resources.

11. The controller of claim 10, wherein the processing forms part of a digital signal processor context, a digital signal processor context comprising one or more digital signal processor channels that are limited to a particular digital signal processor core.

12. The controller of claim 10, wherein the call comprises one or more of:
at least one video call;
at least one audio call;
a request for a telecommunications service; and
a teleconference.

13. The controller of claim 10, wherein the controller is configured to:
responsive to the first digital signal processor core being able to provide the second set of processing resources, allocate the second set of processing resources on the first digital signal processor for the processing of the call.

14. The controller of claim 10, wherein the controller is configured to:
   determine if at least the first set of resources are successfully reserved on the second digital processor core, and
   responsive to at least the first set of resources being unsuccessfully reserved, reject the request.

15. The controller of claim 10, wherein the controller is configured to:
   responsive to no one of the plurality of digital signal processor cores being able to provide the second set of processing resources, reject the request.

16. The controller of claim 10, wherein reserving at least the first set of processing resources on the second digital processor core comprises reserving both the first and second set of processing resources on the second digital processor core.

17. The controller of claim 10, wherein each set of processing resources comprises one or more resource units, the resource units being associated with at least one of: central processor unit resources, memory resources and teleconference resources.

18. The controller of claim 17, wherein a resource unit comprises one or more digital signal processor channels.

* * * * *